July 15, 1924.

A. G. HOOVENS 1,501,603

MACHINE FOR MANUFACTURING WIRE CABLE

Filed May 26, 1923     5 Sheets-Sheet 2

Inventor
A. G. Hoovens.
By E. W. Anderson
Attorneys

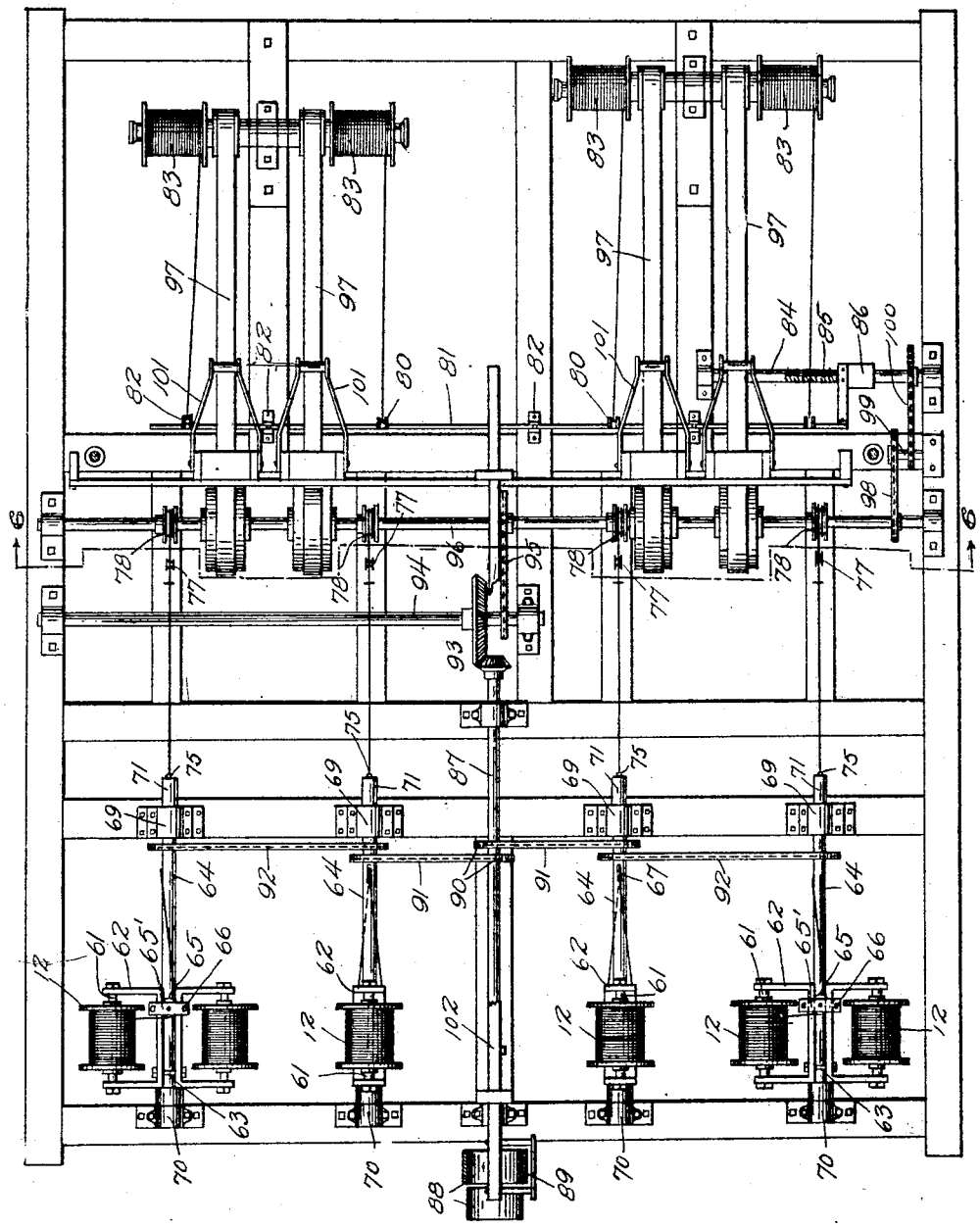

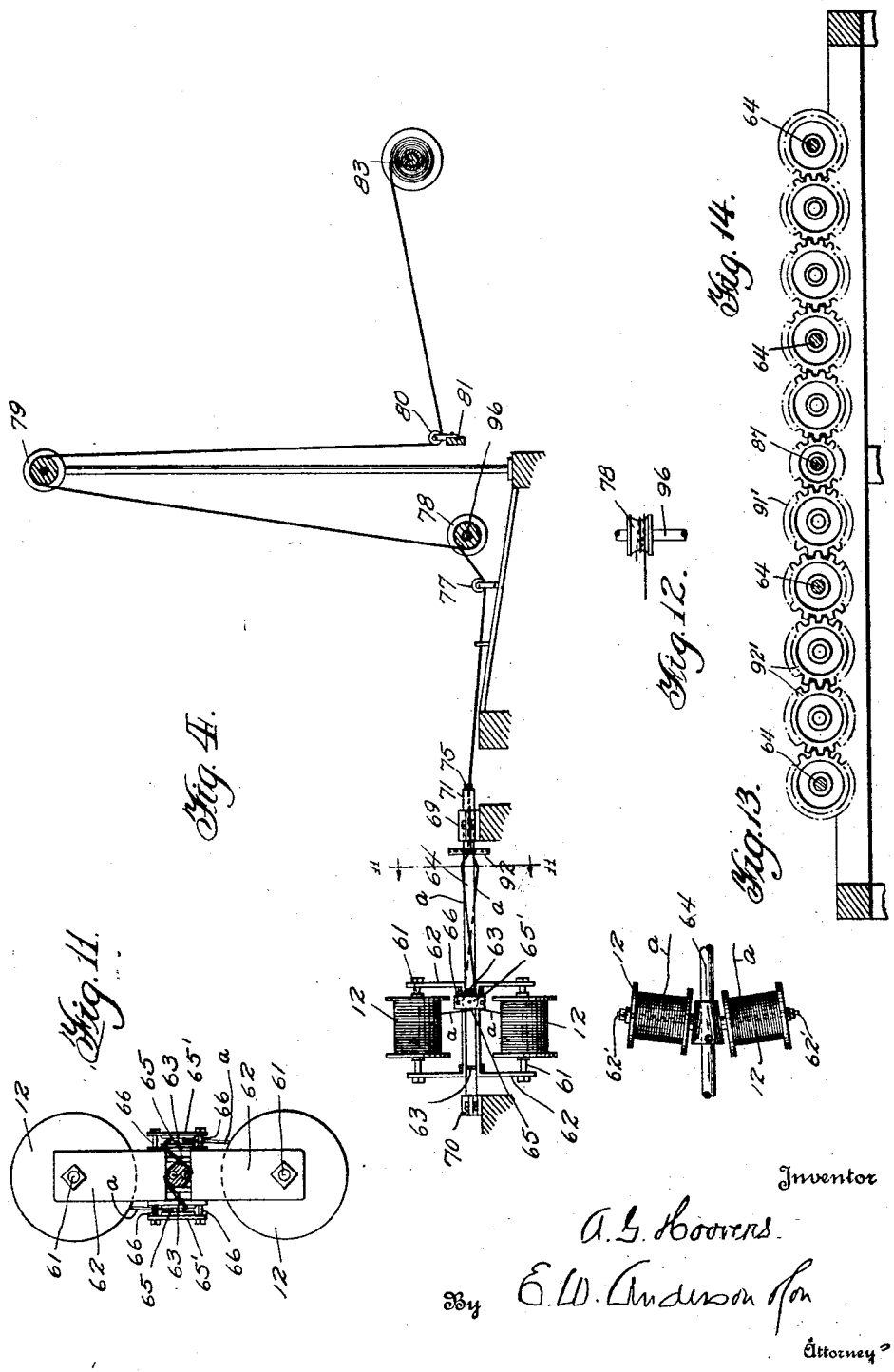

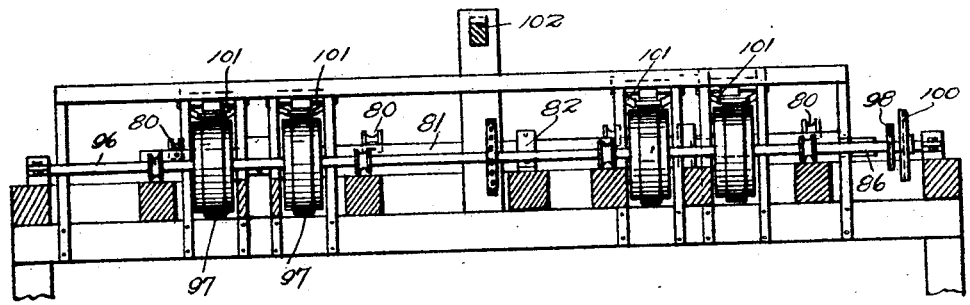
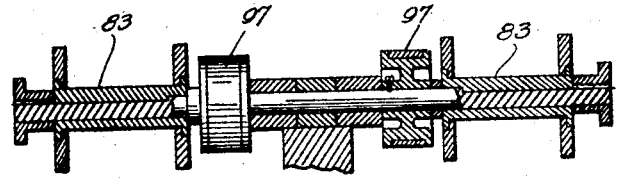
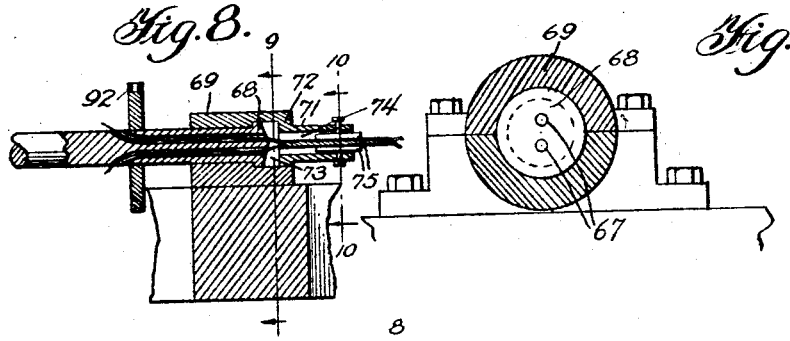
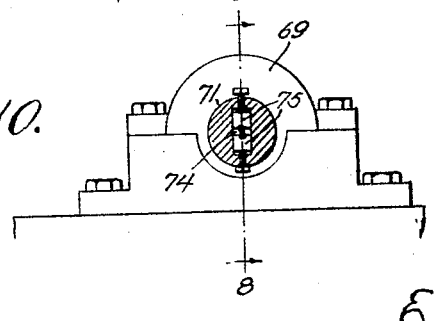

Patented July 15, 1924.

1,501,603

UNITED STATES PATENT OFFICE.

AMASA G. HOOVENS, OF GOSHEN, INDIANA.

MACHINE FOR MANUFACTURING WIRE CABLE.

Application filed May 26, 1923. Serial No. 641,636.

*To all whom it may concern:*

Be it known that I, AMASA G. HOOVENS, a citizen of the United States, residing at Goshen, in the county of Elkhart and State of Indiana, have made a certain new and useful Invention in Machines for Manufacturing Wire Cable, of which the following is a specification.

The invention has relation to machines for manufacturing wire cable of that species designed for use as a lightning conductor in the protection of buildings against storm hazards, the present invention being concerned with the second step of said manufacture, wherein a plurality of wire strands fed from take off spools are brought together and twisted to form a rope and the same wound upon receiving spools, the latter being used in a machine for performing the third step of said manufacture and with which we are not herein concerned.

The invention consists in the novel construction and combinations of parts as hereinafter set forth.

In the accompanying drawings illustrating an embodiment of the invention, the following is a brief description of the figures:

Figure 3 is a top plan view of the same.

Figure 4 is a side view partly diagrammatic, showing the course of the wire from the take off to the receiving spools.

Figure 6 is a transverse detail sectional view on the line 6—6, Figure 3.

Figure 7 is a detail section on the line 7—7, Figure 3, showing the spool construction.

Figure 8 is a longitudinal detail section of the wire twisting means, on the line 8—8, Figure 10.

Figure 9 is a detail cross section on line 9—9, Figure 8.

Figure 10 is a section on the line 10—10, Figure 9.

Figure 11 is a section on the line 11—11, Figure 4.

Figure 12 is a detail plan view of the pull out pulley.

Figure 13 is a detail view of the modification of the take-off spool arrangement.

Figure 14 is a detail side view, corresponding to Figure 5, of a modified or gear drive for the take off spools.

Figure 1:
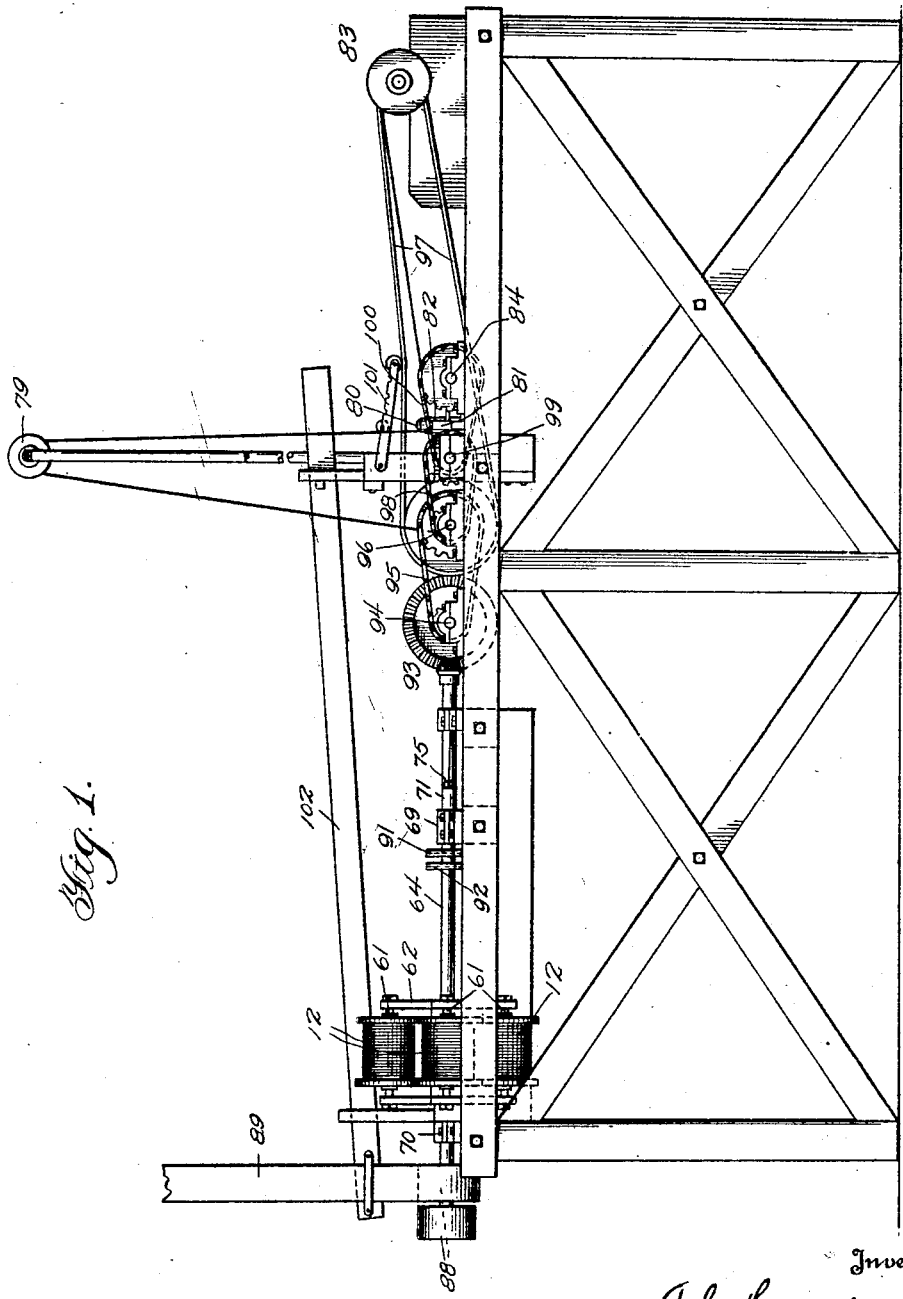
Figure 1 is a side view of the machine.
Figure 2:
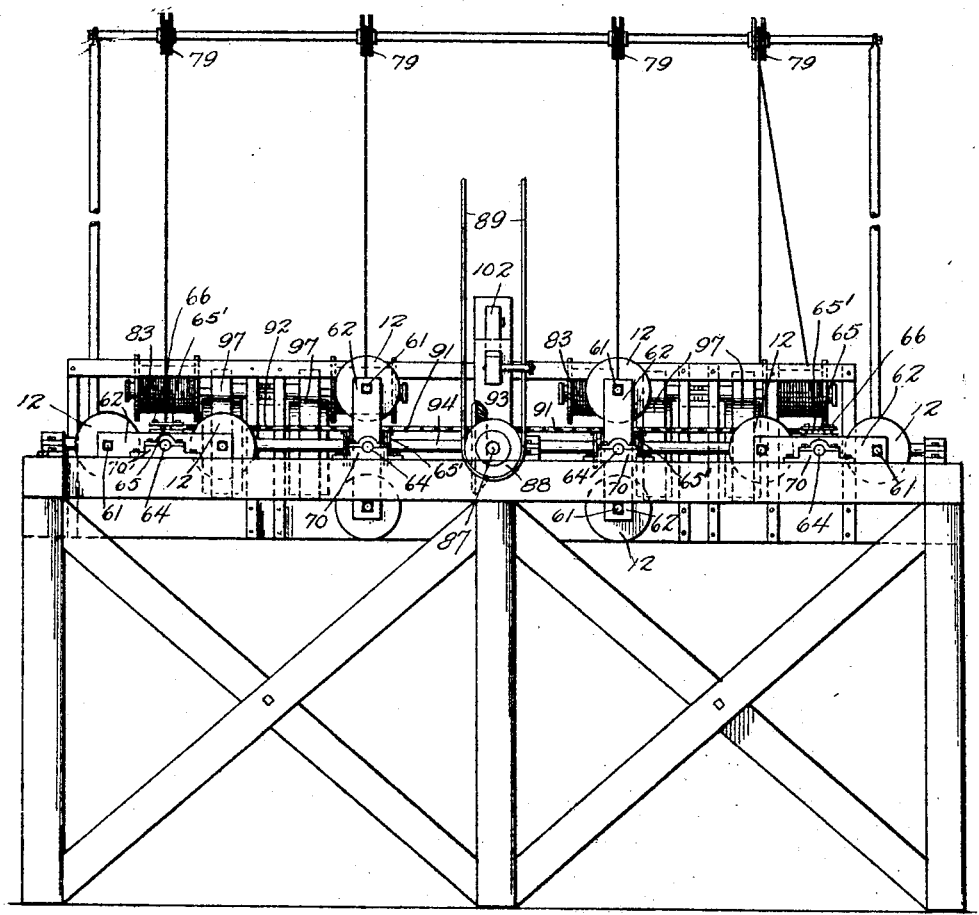
Figure 2 is an end view of the same.
Figure 5:
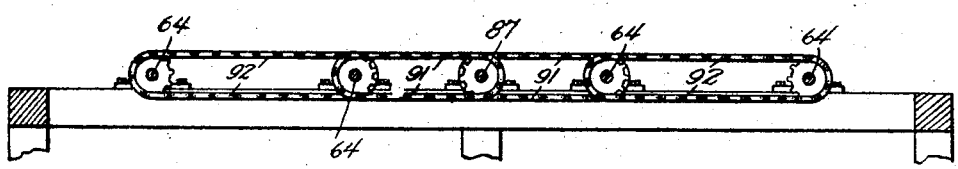
Figure 5 is a detail side view of the chain drive for the take off spools.

In these drawings the numeral 12 designates the take off spools, removably secured upon shafts 61 of yoke frames 62, two of said yoke frames being located oppositely and secured by bolts 63 to a shaft 64, the yoke frames and said spools revolving in the rotation of shaft 64, and said spools being rotatable upon their own shafts 61.

The wire strands $a$, pass from the spools 12, as shown in Figure 4 of the drawings, towards each other to guide pulleys 65, located oppositely of shaft 64, the frames 65' of these pulleys being secured by bolts 66 to rotate with said shaft and with the aforesaid spools 12, said wire strands passing from said guide pulleys rearwardly of the machine to points diametrically opposite and adjacent to shaft 64 and entering short passages 67, at one end portion of said shaft, said passages starting circumferentially of the shaft and being inclined towards each other and then assuming parallel relation longitudinal of said shaft (see Figure 8) and ending and opening at the end of the shaft, which is headed at 68 and rotates in bearings 69, the other or forward end of the shaft rotating in bearings 70.

Adjacent the rear end of the shaft 64 is a stationary frame 71, formed in the present instance integral with the bearing 69 aforesaid, and having its wall spaced from the rear end of shaft 64 at 73, and provided with a passage 74, parallel to the passages 67 and central thereof and of larger diameter, and through which the wire strands $a$ pass after emerging from the passages 67, said passage 74 being continued between opposite jaws 75, movable radially within said frame 71, and adjustable by radial screws 76, to accord with the size of the rope to be made, which latter is dependent upon the number of strands of wire $a$ to be twisted together to form the rope.

The wire strands being arranged as stated, and the shaft 64 set in rotation and tension exerted upon the rear ends of the wire strands to continuously pull the same through the jaws of said die frame, which latter grip the wire strands to hold them against rotation, the strands $a$ will be twisted together in the interval or space 73, and will enter and pass through the passage 74 of the die frame in twisted cable form.

The twisted wire rope passes from the jaws 75 of the die frame, rearwardly under guide pulley 77 and thence slightly upwardly to pull out pulley 78, around which the rope passes two or three times to cause said pull out pulley in its rotation to frictionally grip the rope and exert tension thereon continuously in the rotation of said pulley to pull or draw the rope from the aforesaid jaws 75. The rope passes from the pull out pulley 78 upwardly over guide pulley 79, and thence downwardly under guide pulley 80, the latter carried by distributor bar 81, arranged transversely of the machine and having reciprocatory movement imparted thereto by means to be presently described, said distributor bar being mounted upon roller bearings 82.

From the pulley 80 of the distributor bar, the wire ropes pass to the receiving spools 83, whereon the ropes will be wound, said receiving spools being rotated at the same rate of speed as are the pull out pulleys 78, the latter drawing the ropes continuously from the jaws of the die as stated, and the receiving spools taking up the slack in the ropes so drawn or fed thereto.

The distributor bar 81, is slid back and forth transversely of the machine to distribute the wire cable upon the receiving spools, by means of a double or reversely threaded screw 84, whereon is engaged a shifting block 86 having a pin 85, the rotation of said screw in a single direction first feeding the shifting block in one direction and then in the other repeatedly.

The drive shaft 87 of the machine has fast and loose pulleys 88, and a drive belt 89, and is provided with sprocket gears 90, having sprocket chain connections 91, with the shafts 64 of the wire twisting means aforesaid, there being two take off spools 12 for each shaft 64. Sprocket gearing 92 is provided between the two central shafts 64 and the end shafts 64, there being four shafts 64 and four sets of wire twisting mechanism in the machine illustrated.

The rear end of the drive shaft 87 has bevel gear connection 93 with a transverse shaft 94, the latter having sprocket gearing connection 95 with a transverse shaft 96, whereon the pull out pulleys 78 are mounted, the shaft 96 having belt drive connection 97 with the receiving spools 83.

The transverse shaft 96 has sprocket gearing connection 98 with a stud shaft 99, the latter having sprocket gearing connection 100 with the screw rod 84 aforesaid.

A brake device 101 is provided for each belt 97, and a shifting rod 102 is provided to shift the drive belt 89 in starting and stopping the machine.

The take off and receiving spools are both removably secured upon their shafts.

When the receiving spools are wound to capacity, the wire cable is cut manually and the machine stopped.

In Figure 13 of the drawings, a modification is shown wherein the take off spools 12 are arranged in upright position or with their shafts 62 projecting outwardly from the shaft 64 with which they revolve, rather than parallel to said shaft.

Instead of the chain drive for the take off spools hereinbefore described, gears 91' (Figure 14) may replace the chains 91 between the drive shaft 87 and the central shafts 64, and gears 92' may replace the chains 92 between the central and end shafts 64.

Owing to the fact that the shaft 64 has at one end portion thereof a plurality of short longitudinal apertures 67 adjacent and parallel to each other, it is possible to form said apertures or passages completely within and with all walls thereof integral of said shaft and to bring said passages closer to each other, which is of advantage in bringing the wire strands or ropes closer together in parallel prior to twisting the same together to form the larger rope or cable.

Obviously the invention is designed for use in twisting three, four or other numbers of wire strands together to form a cable.

I claim:—

In a machine for making wire rope, a plurality of parallel rotary shafts, a plurality of take off spools carried by each shaft and revolving therewith, means cooperating with said shaft for twisting wire strands fed from the said spools together to form ropes, including a shaft carrying a plurality of pull-out pulleys around each of which one of said ropes pass, an elevated shaft carrying a plurality of guide pulleys around which said ropes pass from the pull-out pulleys, a plurality of stub shafts approximately axially aligned and at right angles to the shafts of the take-off spools, a receiving spool removably mounted upon each end of each stub shaft, an endwise slidable reciprocatory distributor rod common to the receiving spools and carrying a plurality of guide pulleys around which the ropes pass from the last named guide pulleys, and drive means including a power shaft common to and having driving connections with the shafts of the receiving and take-off spools, the shaft of the pull-out pulleys and said distributor rod.

In testimony whereof I affix my signature.

AMASA G. HOOVENS.